United States Patent
Penhoat et al.

(10) Patent No.: US 8,937,857 B2
(45) Date of Patent: Jan. 20, 2015

(54) METHOD OF DYNAMICALLY CONTROLLING THE NUMBER OF DATA STREAMS TRAVELING THROUGH A NETWORK ARCHITECTURE

(75) Inventors: Joël Penhoat, Lannion (FR); Tarek Tafasca, Etang-Salé les Hauts (FR); Marouane Benyekhlef, Casablanca (MA)

(73) Assignee: Orange, Paris (FR)

( * ) Notice: Subject to any disclaimer, the term of this patent is extended or adjusted under 35 U.S.C. 154(b) by 936 days.

(21) Appl. No.: 12/529,218

(22) PCT Filed: Feb. 29, 2008

(86) PCT No.: PCT/FR2008/050343
§ 371 (c)(1),
(2), (4) Date: Aug. 31, 2009

(87) PCT Pub. No.: WO2008/119915
PCT Pub. Date: Oct. 9, 2008

(65) Prior Publication Data
US 2010/0056152 A1     Mar. 4, 2010

(30) Foreign Application Priority Data
Mar. 13, 2007 (FR) ..................... 07 53803

(51) Int. Cl.
  H04J 1/16       (2006.01)
  H04W 28/10      (2009.01)
  H04L 12/801     (2013.01)
  H04L 12/851     (2013.01)
  (Continued)

(52) U.S. Cl.
  CPC ............ *H04W 28/10* (2013.01); *H04L 47/14* (2013.01); *H04L 47/2441* (2013.01); *H04L 47/2491* (2013.01); *H04W 92/02* (2013.01)
  USPC ........ 370/230; 370/331; 370/395.2; 370/401; 455/439

(58) Field of Classification Search
  None
  See application file for complete search history.

(56) References Cited

U.S. PATENT DOCUMENTS 6,202,094 B1 * 3/2001 Grosser et al. ............... 709/226
7,130,339 B2 * 10/2006 Frank .......................... 375/225
(Continued)

FOREIGN PATENT DOCUMENTS

WO   WO 2005/114920 A1   12/2005
WO   WO 2006/037361 A1   4/2006

OTHER PUBLICATIONS

Motorola, "Motorola UMA—A Residential Seamless Mobility Solution," Internet publication, retrieved from website: http://www.motorola.com/mot/doc/5/5550_MotDoc.pdf, pp. 1-16 (Feb. 21, 2005).

*Primary Examiner* — Jae Y Lee
*Assistant Examiner* — Tito Pham
(74) *Attorney, Agent, or Firm* — Drinker Biddle & Reath LLP

(57) ABSTRACT

The invention relates to a method and a system of communication between at least one first communications terminal (13) of a first communications network (10) and at least one second communications terminal (14) of a second communications network (11), said first network (10) and said second network (11) being interconnected via an interface device (12). According to the invention the method includes:
  a step of dynamically calculating a maximum bit rate of data streams in transit between the first and second terminals (13, 14) taking account of bit rates observed in the first network (10) and the second network (11); and
  a step of processing a request by said first and second terminals (13, 14) for admission of a new data stream, said interface device (12) being adapted to execute said processing taking account of the result produced in said calculation step.

14 Claims, 2 Drawing Sheets

(51) Int. Cl.
*H04L 12/857* (2013.01)
*H04W 92/02* (2009.01)

(56) References Cited

U.S. PATENT DOCUMENTS 7,336,605 B2 * 2/2008 Bruckman et al. ............ 370/230
2001/0048682 A1 * 12/2001 Fichou et al. ................. 370/392
2003/0202468 A1 * 10/2003 Cain et al. ..................... 370/229
2004/0082338 A1    4/2004 Norrgard et al.
2006/0083238 A1 *  4/2006 Lee et al. ...................... 370/389
2007/0238448 A1 * 10/2007 Gallagher et al. ......... 455/414.2
2009/0135729 A1 *  5/2009 Saffre .......................... 370/252
2009/0196302 A1 *  8/2009 Pastorino et al. ............. 370/401
2011/0149838 A1 *  6/2011 Gallagher et al. ............ 370/328

* cited by examiner

METHOD OF DYNAMICALLY CONTROLLING THE NUMBER OF DATA STREAMS TRAVELING THROUGH A NETWORK ARCHITECTURE

CROSS-REFERENCE TO RELATED APPLICATIONS

This application is the U.S. national phase of the International Patent Application No. PCT/FR2008/050343 filed Feb. 29, 2008, which claims the benefit of French Application No. 07 53803 filed Mar. 13, 2007, the entire content of which is incorporated herein by reference.

FIELD OF THE INVENTION

The present invention relates to communication between terminals of different communications networks, for example between a terminal of a private mobile local area communications network and a terminal of a wide area communications network administered by an operator.

To be more precise, the invention relates to controlling the setting up of a new call between such terminals as a function of the quality of service level offered by the networks hosting the terminals at a given time.

BACKGROUND OF THE INVENTION

The invention applies particularly, but not exclusively, to a UMA (Unlicensed Mobile Access) network architecture. A UMA architecture enables users to use their mobile telephones on an IP (Internet Protocol) local area network when at home, at work or, more generally, in an area covered by an access point of an IP private mobile local area network, rather than using the chargeable fixed or mobile network of an operator.

Under the UMA standard, an approach of this kind has the advantage of significantly reducing call costs, especially for businesses, where the number of calls made by its staff is often high.

A simple illustrative and non-limiting example is the use a network architecture conforming to the UMA standard to extend GSM/GPRS mobile services in free access IP wireless networks (Wi-Fi™ or Bluetooth™ networks in particular) by creating a direct communication tunnel between a client communications terminal and the core network of the operator, with the following objectives:

- enabling the user to use mobile voice and data services via private networks, retaining the same telephone number;
- supporting handover between a private network and a GSM network;
- remaining independent of the technology of the private network, for example the Wi-Fi™ or Bluetooth™ technology, while being transparent for existing units in the private network;
- ensuring security equivalent to that of a GSM network.

In the context of a residential UMA architecture (for example that deployed in the context of the Unik™ offer from Orange™), when an outgoing call request is generated by a GSM/GPRS-type communications network on a Wi-Fi™ network, a decision is taken relatively simply, in accordance with criteria defined beforehand by the mobile telephone operator.

If at the time of the call request the terminal is located in the coverage area of its Wi-Fi gateway, forming a unique access point to the network of the operator, then the Wi-Fi call is extended via the core network of the operator to the remote terminal for which the call is intended.

Otherwise, the outgoing call is switched to the chargeable GSM network of the operator automatically and without interruption (this procedure is usually known as "handover").

Making such decisions proves incompatible with the use of a business-type UMA network architecture because, in such an architecture, the communication gateway serves as an interface between the private mobile local area network (of IP type, for example) of the business and the communications network of the operator. The gateway therefore needs to supervise and manage simultaneously a plurality of access points to the mobile local network, distributed over the site of the business, and must additionally manage a large number of calls by a large installed base of mobile communications terminals associated with the business's staff.

The maximum number of VoIP (Voice over IP) streams that a communications network can transmit at a given time, especially in a UMA architecture, proves to be an important parameter, representative of the level of quality of service (QoS) perceived by users.

If the number of VoIP streams in transit on the network at a given time exceeds this maximum number, the QoS offered to users is significantly degraded.

Also, one drawback of a UMA architecture comprising a plurality of mobile terminals (for example of the GSM, GPRS type) able to connect to a plurality of access points (AP) managed by a unique communication gateway (UMA gateway) enabling the IP private local area network of the business to interface with the core network of an operator, is primarily linked to the difficulty of being able to guarantee users and maintain a constant QoS, especially if there is a high influx of calls at a given time or over a given period.

Because of the large number of calls generated in the business on a daily basis, the maximum number of VoIP streams authorized by the operator will often be reached, with the consequence of degrading the quality of calls in transit via the UMA communication gateway.

In an attempt to address this problem, some technical approaches evaluate the maximum number of VoIP streams in transit at a given time in the WAN (Wide Area Network) of the UMA architecture, i.e. only on the operator core network side.

Such a prior art approach proves limited, however, in that it only partially addresses the above-mentioned drawbacks.

Although it is now possible for an operator to determine the maximum number of VoIP streams in transit on the WAN part of the network, either statically by recovering a predefined parameter value (maximum authorized VoIP streams), or dynamically, by means of a CAC (Call Admission Control) algorithm, with the objective of evaluating the possibility of adding a new stream, it is nevertheless impossible to evaluate the impact of adding any such new stream, end-to-end, both on the WAN part and, more importantly, on the WLAN part of a private mobile network. The degraded QoS of calls in a business-type UMA architecture stems most often from overloading said business's private mobile network.

What is more, in UMA architectures, there is no dynamic calculation of the number of VoIP streams, the WMM™ (Wireless MultiMedia) standard that aims to define criteria and methods of improving the quality of service rendered to wireless communication users specifying in its paragraph 3.5.2 (Version 1.1—Wi-Fi Alliance Technical Committee Quality of Service Task Group) that a method of determining the maximum VoIP stream value in a UMA architecture must be defined by each equipment manufacturer.

This situation contributes to the difficulty now encountered by operators and equipment manufacturers of being able to offer to businesses attractive and performing telephony solutions based on a UMA architecture.

SUMMARY OF THE INVENTION

The present invention offers a solution that is free of the drawbacks mentioned above.

The invention aims to eliminate the above-mentioned drawbacks by proposing a method of calculating and controlling the maximum number of VoIP streams in transit at a given time and/or over a given period in both the WLAN portion and the WAN portion (GSM/GPRS network of a mobile telephony operator) and thus from end-to-end in a network architecture conforming to the UMA standard.

A particular aim of the present invention is to be able to control admission or refusal of any new data stream representing a new call (a VoIP stream in particular), with the objective of assuring users a constant quality of service level during calls via a UMA architecture, in particular as implemented within a business.

To this end, the invention consists in a method of communication between at least one first communications terminal of a first communications network and at least one second communications terminal of a second communications network, said first network and said second network being interconnected via an interface device, characterized in that it includes:

- a step of dynamically calculating a maximum bit rate value of data streams in transit between the first and second terminals taking account of bit rates observed in the first and second networks; and
- a step of processing a request by said first and second terminals for admission of a new data stream, said interface device being adapted to execute said processing taking account of the result produced in said calculation step.

The present invention proposes a solution that has the advantage that when, in a UMA network architecture, a first terminal of a first communications network, for example an IP private mobile wireless local area network (WLAN), is seeking to set up a new call with a second terminal of a second communications network, for example a wide area network (WAN), it evaluates the end-to-end availability of resources in the first and second communications networks. Accordingly, as a function of the result of this evaluation, if at least one of the two networks does not have resources available, especially in terms of bandwidth, to carry the data streams (for example voice data streams) necessary to support the new call, then said call is handed over to the mobile network of an operator.

Said processing step is preferably a step of dynamically analyzing at least one availability criterion associated with each of said networks such that:

- if each network is available to receive said new data stream, a communication tunnel is reserved via said interface device rated as a function of the bit rate necessary to support said new data stream between said first terminal and said second terminal; and
- if at least one of said networks is not available, said new data stream is handed over to a mobile communications network.

Said step of reserving said communication tunnel advantageously includes at least one preliminary step of dynamically calculating a maximum bit rate of said new data stream as a function of at least one parameter representing a coding-decoding operation applied to said stream.

In one particular implementation of the invention said at least one preliminary dynamic calculation step is a function of at least one parameter representing a type of coder-decoder used by said terminal to process said stream.

Such an approach advantageously calculates a maximum bit rate necessary for transmitting the new data stream, especially a UMA voice stream, whatever type of coder-decoder is associated with the terminal of the first communications network.

In another implementation of the invention, said at least one preliminary dynamic calculation step is a function of at least one parameter representing a mode of operation of a coder-decoder used by said first terminal to process said stream.

In a preferred implementation of the method of the invention, said second communications network is a wide area network (WAN) including a virtual communications channel a first end of which is connected to said interface device and a second end of which is connected to a collection and routing unit, and said dynamic analysis step is a step of said interface device verifying a possibility of adding said new data stream to said virtual channel.

Still in the preferred implementation of the method of the invention, said first communications network (10) is a free access IP wireless local area network (WLAN) comprising a plurality of access points ($15_i$, i=1, ..., N) and said dynamic analysis step is a step of at least one access point ($15_i$, i=1, ..., N) verifying a possibility of adding said new data stream to said first network between said interface device and said access point.

When said first communications terminal sends an outgoing call request, it preferably sends said interface device via an access point a solicitation message carrying a request for reservation of resources, so that if said request for reservation of resources for the sending a data stream via said access point cannot be met, a step of at least one other access point to which said communications terminal (13) can be connected automatically sending a resource solicitation message is initiated.

If reservation of resources on the first network has been possible with a view to adding the new stream (for example a UMA voice data stream), the method preferably includes a step of adding said new data stream to a management table for the streams of said first network (located in the interface device or at least one access point) and a step of said interface device verifying a possibility of adding said data stream to said second network, so that if this possibility is established, a step is executed of adding said new data stream to a management table for the streams of said second network, said table being contained in said interface device.

Thus, to go into more detail, if an outgoing call request is sent by said first communications terminal to set up a call with said second communications terminal, the following steps are executed:

step 1: transmission by said first terminal of a message requesting reservation of resources for said new data stream going to at least one first available access point;

step 2: verification by said first access point of the possibility of adding said new stream to said first network, so that if this possibility is established, the following additional steps are executed:

said first access point sending said interface device a message requesting reservation of resources for said new stream on said second network;

said interface device verifying a possibility of adding said new stream to said second network, so that if said possibility is established the following additional steps are executed;
    addition of said new data stream to a management table of the streams of said interface device;
    said interface device sending said first access point a message accepting said request for reservation of resources for said new data stream on said second network;
    adding said new data stream to a management table of the streams of said first network;
    said first access point sending said first terminal a message accepting said request for reservation of resources for said new data stream on said first network; and
    setting up said call between said first terminal and said second terminal;
and if at least one possibility of adding said new data stream to the first or second network is not established, at least one of the following steps is executed:
    for any other available access point of said first network different from said first access point, iteration of said steps 1 and 2 mentioned above; and
    handing over said outgoing call to a mobile communications network.

With an incoming call request coming from said second communications terminal to set up a call with said first communications terminal, the following steps are preferably executed:
    step A: said second terminal sending said interface device a message requesting reservation of resources for said new data stream on said second network;
    step B: said interface device verifying a possibility of adding said new stream to said second network, so that if said possibility is established, the following additional steps are executed:
        said interface device sending at least one first available access point to which said first terminal is connected a message requesting reservation of resources for said new data stream on said first network;
        said available first access point verifying a possibility of adding said new stream to said first network, so that if that possibility is proved, the following additional steps are executed:
            addition of said new data stream to a management table of the streams of said first network;
            said available access point sending said interface device a message accepting said request for said new stream on said first network;
            adding said new data stream to a management table of the data streams of said second network; and
            setting up said call between said first terminal and said second terminal;
and if at least one possibility of adding said new data stream to the first or second network is not established, at least one of the following steps is executed:
    for any other access point of said first network, available and different from said first access point, iteration of said steps A and B mentioned above; and
    handing over said outgoing call request to a mobile communications network.

Said new data stream is preferably a UMA voice type stream.

The invention also consists in a system of communication between at least one first communications terminal of a first communications network and at least one second communications terminal of a second communications terminal, said first network and said second network being interconnected via an interface device, characterized in that it includes:
    means for dynamically calculating a maximum bit rate of data streams in transit between said first and second terminals taking account of at least one bit rate observed in the first communications network and/or the second communications network; and
    means for processing a request by said first and second terminals for admission of a new data stream, said interface device being adapted to execute said processing taking account of the result produced by said calculation means.

In the system of the invention, said first communications terminal preferably conforms to the UMA standard.

The invention also consists in a computer program product downloadable from a communications network and/or stored on a computer-readable information medium and/or adapted to be executed by a microprocessor, said program including code instructions for executing the above communications method.

BRIEF DESCRIPTION OF THE DRAWINGS

The features and technical advantages of the present invention emerge more clearly from the following description, given by way of non-limiting illustration and with reference to the appended drawings, in which.

DETAILED DESCRIPTION

The present invention proposes a solution which, in a UMA network architecture, when a first terminal of a first communications network, for example an IP private mobile wireless local area network (WLAN), is seeking to set up a new call to a second terminal of a second communications network, for example a wide area network (WAN), evaluates the end-to-end availability of the resources available in the first and second communications networks. Accordingly, as a function of the result of this evaluation, if either or both of the two networks does not have resources available, particularly in terms of bandwidth, to carry the data stream (for example a voice data stream) necessary to support the new call, then the call is handed over to the mobile network of an operator.

Figure 1:
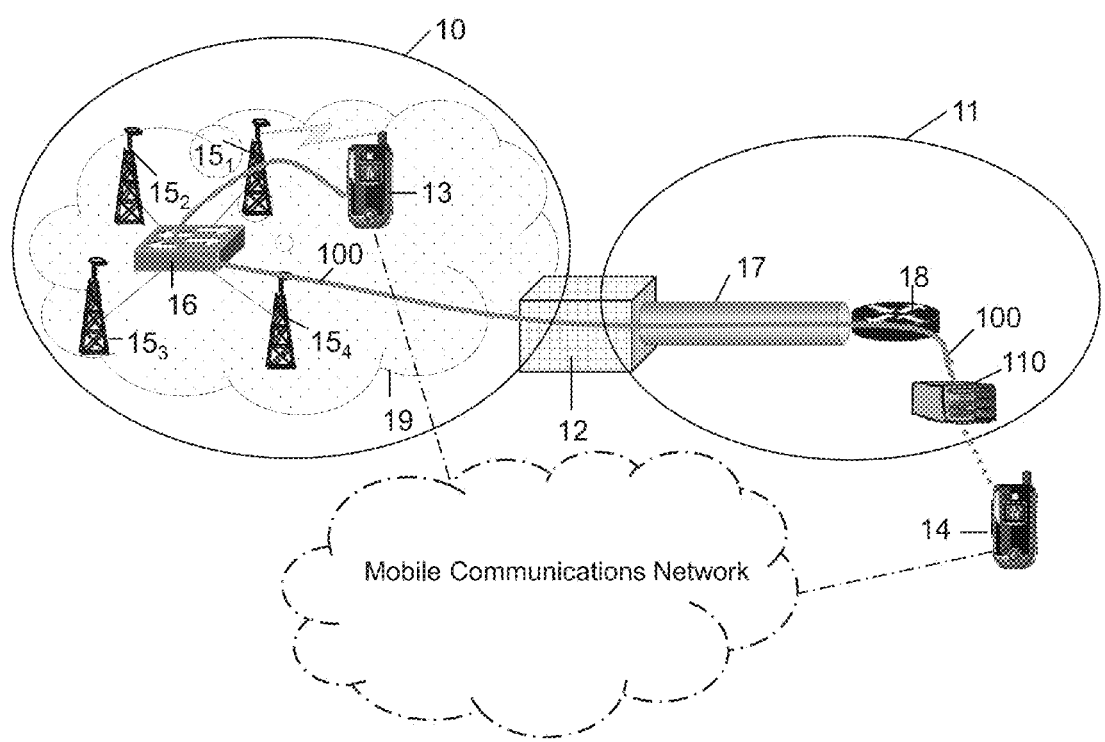
FIG. 1 is a diagrammatic view of an architecture in which a communications method and system of the invention are used.

FIG. 1 illustrates a UMA network architecture in which the invention can be used. This architecture includes a first part 10 corresponding to a wireless local area network (WLAN) 10, for example an IP private mobile local area network, and a second part 11 corresponding to the core network part of a wide area network (WAN) of an operator. A hardware interface device 12 extends communications services between the WLAN 10 and the WAN 11, in particular for calls set up between a first radio communications terminal 13 of the WLAN and a second remote communications terminal 14 reached via at least one collection and/or routing unit 18 and/or at least one secure gateway 110 of the WAN.

The WLAN 10 comprises access points $15_1$, $15_2$, $15_3$, $15_4$ connected to the interface device 12 via an Ethernet switch 16, all the access points, including the interface device 12, defining a coverage area 19 (or business zone) for the IP mobile local area network 10 within that the communications terminals 13 are recognized.

The terminals 13 conform to the UMA standard (Technical Specification Group GSM/EDGE Radio Access Network; Generic Access to the A/Gb interface; Stage 2—version 6—January 2006) and the business zone 19 conforms to the WMM™ standard (WMM™—Version 1.1—Wi-Fi Alliance Technical Committee Quality of Service Task Group).

The business zone 19 includes a DHCP server on the interface device 12. The WAN interface of the interface device 12 executes the network address translation (NAT) function (1 to N).

The source IP address of an IPsec (secure IP) packet sent by a UMA terminal 13 to a secure gateway 110 of the WAN 11 comes from the IP address range administered by the DHCP server of the business zone 19.

A conversational virtual channel (VC) 17 is set up in the WAN part 11 of the UMA architecture between the interface device 12 and a collection and routing unit 18 of the WAN 11, said unit forming an access point of the multiservice point of presence (PoP), including the Voice over IP service.

Setting up a secure connection between a terminal 13 and the secure gateway 110 requires (i) detecting the presence of the NAT function in the WAN interface of the interface device, and (ii) authenticating the two ends of the connection. The secure connection is set up under the IKEv2 protocol.

The steps of setting up a secure connection between the terminal 13 and the secure gateway 110 of the WAN are not described in detail here.

Referring to the FIG. 1 architecture, the maximum number of UMA voice streams that can be in transit end-to-end on the first communications network 10 and the second communications network 11 substantially corresponds to whichever is the lower of (i) the maximum number of UMA voice streams that the conversational VC 17 can transmit, and (ii) the maximum number of UMA voice streams that the business zone 19 can handle.

The conversational VC 17 transmits fixed telephony streams, UMA voice streams, secure connection set-up and maintenance streams, and other UMA data streams in transit on the part 12 of the WAN.

At a time $t$, the maximum number of UMA voice streams that the conversational VC can transmit is called the UMA VC CAC. Because it is bidirectional, it is calculated for the uplink or downlink direction.

Furthermore, each mobile local area network, for example each Wi-Fi network, present in the business zone 19 can transmit UMA voice streams, secure connection set-up and maintenance streams, and various other UMA and/or data streams.

At the same time $t$, the maximum number of UMA voice streams that a Wi-Fi network of the business zone 19 can transmit is called the UMA WLAN CAC. Because it is also bidirectional, is also calculated for the uplink or downlink direction.

The maximum number of UMA voice streams in a UMA architecture, such as that represented in FIG. 1, therefore depends on the UMA VC CAC and the UMA WLAN CAC.

a) Calculation of the UMA VC CAC

Calculating the UMA VC CAC requires (i) the bit rate of the conversational VC, and (ii) the bit rate of a UMA voice stream. The bit rates are calculated at the ATM (Asynchronous Transfer Mode) level.

At time $t$, the maximum number of streams transmitted on the conversational VC 17 is such that:

(Bit rate of conversational VC)($t$)=(Bit rate of fixed telephony streams)($t$)+(Bit rate of UMA voice streams)($t$)+(Bit rate of UMA data streams)($t$)+ (Bit rate of IPsec tunnel set-up streams)($t$)+(IPsec tunnel maintenance bit rate)($t$).

At time $t$, the maximum number of UMA streams is such that:

(Bit rate of UMA streams)($t$)=(Bit rate of conversational VC)($t$)−(Bit rate of fixed telephony stream)($t$),for simplicity denoted $Dvc-Dtoip(t)$.

At time $t_k$, the conversational VC 17 is transmitting (k−1) UMA voice streams.

Accordingly, the possibility of adding UMA voice stream No. k therefore makes it necessary to know that maximum bit rate this stream $\underline{k}$ will occupy on the conversational VC 17 on the WAN side.

The bit rate at the ATM level of the UMA voice stream No. k, denoted "bit rate of UMA voice stream $\underline{k}$", is equal to the number of packets per second sent by the codec multiplied by the length of a packet at the ATM level, the codec of the UMA voice stream No. k being itself characterized by the following two parameters:

$R_k$: number of packets per second sent by codec;
(codec bit rate)$_k$: maximum codec bit rate in bps.

There is obtained in this way the following formula for calculating the maximum bit rate of the UMA voice stream No. k, denoted (bit rate of UMA voice stream No. k)$_{max}$, if the codec performs no voice activity detection (VAD) function, i.e. when (bit rate of codec(t))$_k$=(bit rate of codec)$_k$:

(bit rate of UMA voice stream No. k)$_{max}$=$R$*((bit rate of codec)$_k$/$R_k$+length(header(*PLCP-MAC-CCMP-LLC*-IPsec-IP))+length(acknowledgement frame)+*SIFS*Dwlan*)+ ($Rk(t)$−1)**SIFS*Dwlan*+(TIME_FOR_THE_CLASS_TO_TRANSMIT)$_k$**Dwlan*;

where:
"header(PLCP-MAC-CCMP-LLC-IPsec-IP)" denotes bits that are not part of the VoIP field;
Dwlan is the bit rate on the WLAN;
according to the paragraph "Obtaining an EDCA TXOP" of the WMM™ specification (WMM™—Version 1.1, Wi-Fi Alliance Technical Committee Quality of Service Task Group), authorization to transmit a new stream corresponds to the time that the class AC_VO that corresponds to the voice access category must wait before it can transmit its PLCP frames over the Wi-Fi network. This time is denoted (TIME_FOR_THE_CLASS_TO_TRANSMIT)$_k$.

The characteristics of the codec of a terminal are required to calculate the maximum bit rate of a UMA voice stream.

As recommended by the 3GPP™ consortium, the values of the bit rate and the number of packets per second sent by the AMR (Adaptive Multi-Rate) codec (cf. "Technical Specification Group GSM/EDGE Radio Access Network; Generic Access to the A/Gb interface; step 2, Version 6, January 2006) used in third-generation mobile telephones can be considered here in the above equation.

b) Addition of Stream No. k to Conversational VC 17

It is assumed that UMA voice stream No. $\underline{i}$ is transmitted on the conversational VC 17 from a time $t_i$.

The bit rate of the UMA voice stream No. $\underline{i}$, measured between the times $t_i$ and $t_k$, is then equal to:

(Bit rate of UMA voice stream No. $i$)$_{measured\ in\ [ti,tk]}$= (number of bits of UMA voice stream No. $i$)$_{measured\ in\ [ti,tk]}$/($t_1-t_i$).

The summation of the (k−1) streams is denoted $\Sigma_i$=SIGMA (i=1, i=k−1).

At time $t_k$ the addition of the (uniquely identified) UMA voice stream No. k to the conversational VC 17 is possible if the following equation EQ1 is satisfied:

$\Sigma_i$(Bit rate of UMA voice stream No. $i$)$_{measured\ uplink\ in\ [ti,tk]}$+$\Sigma_i$(bit rate of UMA voice stream No. $i$)$_{measured\ downlink\ in\ [ti,tk]}$+2*(Bit rate of UMA voice stream No. $i$)$_{max}$<$(Dvc-Dtoip(t))_{uplink}$+$(Dvc-Dtoip(t))_{downlink}$.

c) Calculation of UMA WLAN CAC

Calculating the UMA WLAN CAC requires (i) the bit rate of the private mobile network, which is a Wi-Fi network in the embodiment described here, and (ii) the bit rate of a UMA voice stream. The bit rates are therefore calculated at the radio level.

The business zone 19 has one or more networks defined by their respective access points $15_1$, $15_2$, $15_3$, $15_4$ according to the 802.11b/g standard.

The nominal bit rate of a Wi-Fi network is denoted Dwlan below.

The bit rate of a Wi-Fi network at time $\underline{t}$ is denoted D(t) and the maximum number of streams transmitted at this time $\underline{t}$ in the Wi-Fi network is calculated as follows:

D(t)=(Bit rate of UMA voice streams)(t)+(Bit rate of data UMA steams)(t)+(Bit rate of IPsec tunnel set-up streams)(t)+(IPsec tunnel maintenance bit rate)(t)+(Bit rate of diverse streams)(t).

At time $\underline{t}$, the maximum number of UMA streams is therefore such that:

(Bit rate of UMA steams)(t)=D(t).

At time $t_k$, corresponding to an attempt to set up a new connection, the Wi-Fi network is already transmitting (k−1) UMA voice streams and the possibility of adding the UMA voice stream No. k therefore requires the maximum bit rate that this stream would occupy on the Wi-Fi network.

d) Calculation of Maximum Bit Rate of UMA Voice Stream No. k

The bit rate at the radio level of the UMA voice stream No. k, denoted "bit rate of UMA voice stream No. k", is equal to the number of packets per second sent by the codec multiplied by the length of a packet at the radio level. Sending a Wi-Fi frame containing a Voice over IP (VoIP) sample is equivalent to sending a virtual Wi-Fi frame containing that sample, which implies that at the radio level the bit rate of UMA voice stream No. k is equal to:

(bit rate of UMA voice stream No. $k$)(t)=$R_k(t)$*(length of Wi-Fi frame No. k)+length(frame acknowledgement)+$t_{sifs}$*Dwlan);

where $t_{sifs}$ is the duration of the short inter-frame space.

e) Addition of UMA Voice Stream No. k to Wi-Fi Network

It is assumed that the UMA voice stream No. i is transmitted over the Wi-Fi network from time $t_i$.

At time $t_k$ adding UMA voice stream No. k to the WLAN-Wi-Fi network 11 is therefore possible if the following equation EQ2 is satisfied:

$\Sigma_i$(Bit rate of UMA voice stream No. $i$)$_{measured\ uplink\ in\ [ti,tk]}$+$\Sigma_i$(bit rate of UMA voice stream No. $i$)$_{measured\ downlink\ in\ [ti,tk]}$+(Bit rate of uplink UMA voice stream No. $k$)$_{max}$+(Bit rate of downlink UMA voice stream No. $k$)$_{max}$<$D(tk)$.

f) Setting Up New Call Between a Terminal 13 of the WLAN 10 and a Recognized Terminal 14 of the WAN 11

Adding UMA voice stream No. k to the conversational virtual channel 17 is then possible if the equations EQ1 and EQ2 are satisfied at time $t_k$ corresponding to a request to set up a new voice call between a communications terminal 13 of the local wireless area network 10 (for example a Wi-Fi network) and a communications terminal 14 recognized by the WAN 11. There are therefore two scenarios for adding a stream, according to whether the call request is an outgoing call request or an incoming call request.

If either or both of the equations EQ1 and EQ2 is not satisfied, it is not possible to add a UMA voice stream No. k to support a new call (independent incoming or outgoing call request) the setting up of which has been requested at time $t_k$ without significantly degrading the quality of service of the VoIP services rendered to the users of the FIG. 1 UMA architecture who are already communicating.

In this situation, the call being set up is handed over to the mobile network of an operator.

Incoming Call Request, Initiated from a Communications Terminal 14, Going to a Communications Terminal 13

Figure 2:
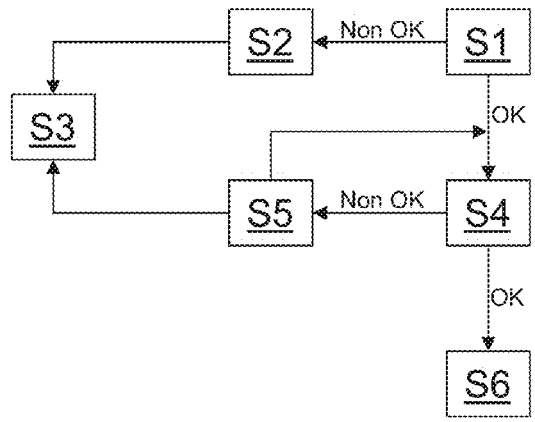
FIG. 2 is a flowchart of one implementation of the communications method of the invention, in relation to an incoming call.

As shown in FIG. 2, if the interface unit 12 receives over its WAN interface a UMA CAC request message concerning the conversational virtual channel 17, it verifies the above-mentioned equation EQ1 (step S1).

If the equation EQ1 is not satisfied, the interface unit 12 sends a UMA CAC response concerning the conversational virtual channel 17, the Status Code field of which message is set to Deny (refusal to add a new UMA voice stream), to the access point $15_1$, in the coverage area of which is located a terminal 13 with which a terminal 14 is seeking to communicate (step S2). Consequently, UMA voice stream No. k is then not transmitted via the LAN interface of the interface device 12.

The call must then be set up using the GSM network of an operator, not the UMA architecture (step S3).

In the converse situation, if the equation EQ1 is satisfied, the interface unit 12 adds UMA voice stream No. k to a management and reference table for UMA voice streams in transit on the conversational virtual channel 17 and then sends a UMA CAC response message concerning the conversational virtual channel 17, the Status Code field of which is set to Accept (addition of field accepted) to the access point (AP) $15_1$, in the coverage area of which is located a terminal 13 with which a terminal 14 is seeking to communicate (step S4).

If the AP $15_1$ receives a UMA CAC response message concerning the conversational virtual channel 17, it verifies the value of the Status Code field.

If that field is set to Deny, the AP $15_1$ sends the terminal 13 an ADDTS response message conforming to the WMM standard in which the Status Code field is set to Deny (step S5).

Conversely, if the field Status Code is set to Accept, the AP $15_1$ verifies the equation EQ2.

If the equation EQ2 is satisfied, the access point $15_1$ adds UMA voice stream No. k to the table of UMA voice streams of the Wi-Fi network 10 and then sends the terminal 13 an ADDTS response message conforming to the WMM standard having the Status Code field set to Accept (step S6).

The call 100 between the communications terminal 13 of the WLAN 10 and the communications terminal 14 attached to the WAN 11 is then set up end-to-end via the UMA architecture of FIG. 1.

In the converse situation, if a communications terminal 13 receives an ADDTS response message conforming to the UMA specification and having its Status Code field set to Deny, then it can (i) search for another available AP among the APs $15_2$ to $15_4$ or (ii) initiate automatic handover to the GSM network of an operator (step S3).

Outgoing Call Request, Initiated from a Communications Terminal 13, Going to a Communications Terminal 14

Figure 3:
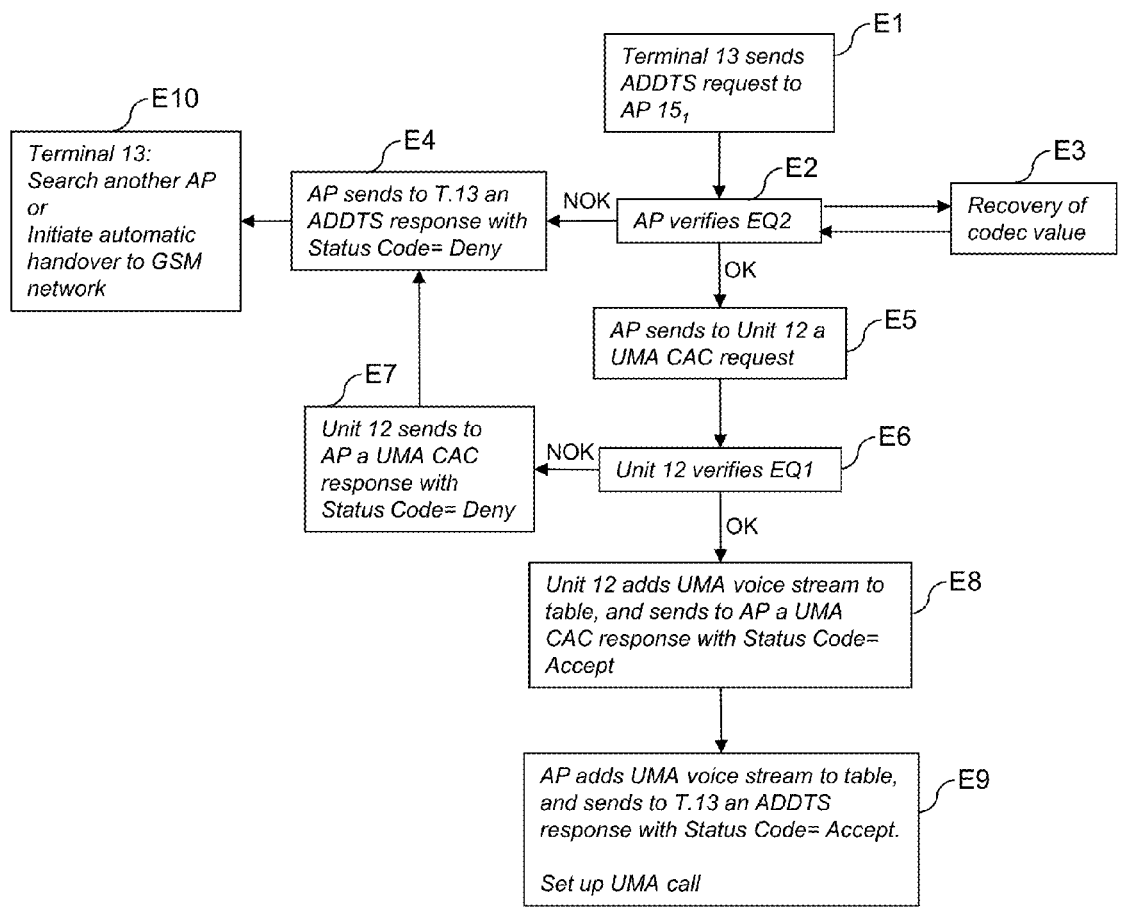
FIG. 3 is a flowchart of one implementation of the communications method of the invention, in relation to an outgoing call.

As shown in the FIG. 3 flowchart, at time $t_k$ corresponding to the initiation of an outgoing call request by a terminal 13 of the WLAN, with a view to setting up a new call to a recognized remote terminal 14 of a WAN 11, conforming to the WMM™ specification, a terminal sends a message containing an ADDTS request to reserve resources on the Wi-Fi network to which the terminal 13 is attached (step E1) for UMA voice stream No. k and intended to support the new call.

On reception of this message, the AP $15_1$ must verify the equation EQ2 (step E2).

If the table of codecs of the terminals administered by the AP $15_1$ does not contain the parameters of the codec of the terminal 13 necessary for verifying the equation EQ2, the AP $15_1$ sends a message requesting recovery of the value of the codec corresponding to the terminal 13 to the interface unit 12 (step E3). Said unit then sends the AP $15_1$ a response message containing the required codec value, integrated into the table of codecs of the AP $15_1$.

As indicated above, the bit rates and numbers of packets per second sent by the AMR codec are preferably used in the equation EQ2 to be verified.

If the equation EQ2 is not satisfied, the AP $15_1$ sends the communications terminal 13 an ADDTS response message conforming to the WMM™ specification with a Status Code field set to Deny (step E4).

In contrast, if the equation EQ2 is satisfied, the AP $15_1$ sends the interface unit 12 a UMA CAC request message concerning the conversational virtual channel 17 (step E5).

When the unit 12 receives said message, it verifies the equation EQ1 (step E6).

If the equation EQ1 is not satisfied, the interface unit 12 sends the AP $15_1$ a UMA CAC response message concerning the virtual channel 17 with a Status Code field set to Deny (step E7).

In contrast, if the equation EQ1 is satisfied, the unit 12 adds UMA voice stream No. k to its UMA voice stream table relating to UMA streams in transit on the virtual channel 17 and then sends the AP $15_1$ a UMA CAC response message having the Status Code field set to Accept (step E8).

When the AP $15_1$ receives a UMA CAC response message concerning the virtual channel 17 with the Status Code field set to Deny, it sends the terminal 13 an ADDTS response message conforming to the WMM™ specification with a Status Code field set to Deny (step E4).

If the Status Code field of said message is set to Accept, the AP $15_1$ adds UMA voice stream No. k to the UMA voice streams table of the Wi-Fi network, and then sends the terminal an ADDTS response message conforming to the WMM™ specification having the status Code field set to Accept (step E9).

The call 100 is then set up via the FIG. 1 UMA architecture.

In contrast, if a UMA terminal 13 receives an ADDTS response message with a Status Code field set to Deny, then it can either (i) search for another AP among the APs $15_2$, $15_3$ or $15_4$ if the first AP $15_1$ was not available or (ii) initiate automatic handover to the GSM network of an operator (step E10).

The invention claimed is:

1. A method of communication between at least one first communications terminal of a first communications network and at least one second communications terminal of a second communications network, said first and said second communications networks being of a different network type and being interconnected via an interface device, said method comprising:
dynamically calculating a maximum bit rate value of data streams that can be in transit between the first and second networks taking account of bit rates observed in the first and second networks;
processing a request for admission of a new data stream between the first and second terminals, said interface device being configured to execute said processing taking account of the result produced in said calculation step; and
if, based on the dynamic calculation, at least one of said networks does not have resources available to execute the request, handing over said new data stream to a mobile communications network distinct from said first and second networks.

2. A method according to claim 1, wherein said processing step includes dynamically analyzing at least one availability criterion associated with each of said networks such that:
if each network is available to receive said new data stream, a communication tunnel is reserved via said interface device rated as a function of the bit rate necessary to support said new data stream between said first terminal and said second terminal; and
if at least one of said networks is not available, said new data stream is handed over to a mobile communications network distinct from said first and second networks.

3. A method according to claim 2, wherein said step of reserving said communication tunnel includes at least one preliminary step of dynamically calculating a maximum bit rate of said new data stream as a function of at least one parameter representing a coding-decoding operation applied to said stream.

4. A method according to claim 3, wherein said at least one preliminary dynamic calculation step is a function of at least one parameter representing a type of coder-decoder used by said first terminal to process said stream.

5. A method according to claim 3, wherein said at least one preliminary dynamic calculation step is a function of at least one parameter representing a mode of operation of a coder-decoder used by said first terminal to process said stream.

6. A method according to claim 2, wherein said second communications network is a wide area network including a virtual communications channel a first end of which is connected to said interface device and a second end of which is connected to a collection and routing unit, and said dynamic analysis step is a step of said interface device verifying a possibility of adding said new data stream to said virtual channel.

7. A method according to claim 6, wherein when said first communications terminal sends an outgoing call request, it sends said interface device via an access point a solicitation message carrying a request for reservation of resources, so that if said request for reservation of resources for sending a data stream via said access point cannot be met, a step of at least one other access point to which said communications terminal can be connected automatically sending a resource solicitation message is initiated.

8. A method according to claim 7, further comprising a step of adding said new data stream to a management table for the streams of said first network and a step of said interface device verifying a possibility of adding said data stream to said second network, so that if said possibility is established, a step is executed of adding said new data stream to a management table for the streams of said device.

9. A method according to claim 2, wherein said first communications network is a wireless local area network comprising a plurality of access points and said dynamic analysis step is a step of at least one access point verifying a possibility of adding said new data stream to said first network between said interface device and said access point.

10. A method according to claim 1, wherein said first terminal conforms to the Unlicensed Mobile Access (UMA) standard and said data stream is a UMA voice stream.

11. A system of communication between at least one first communications terminal of a first communications network and at least one second communications terminal of a second communications network, said first and said second communications networks being of a different network type and being interconnected via an interface device, said system comprising:
- means for dynamically calculating a maximum bit rate of data streams that can be in transit between said first and second networks taking account of the bit rate observed in the first and second communications networks; and
- means for processing a request for admission of a new data stream between the first and second terminals, said processing taking account of the result produced by said calculation means; and
- means for handing over said new data stream to a mobile communications network distinct from said first and second networks, if, based on the dynamic calculation, at least one of said networks does not have resources available to execute the request.

12. A communications system according to claim 11, wherein said first communications terminal conforms to the UMA standard.

13. A computer program product stored on a non-transitory computer-readable information medium, comprising code instructions for executing, when executed by a processor, a method of communication between at least one first communications terminal of a first communications network and at least one second communications terminal of a second communications network, said first and said second communications networks being of a different network type and being interconnected via an interface device, said method comprising:
- dynamically calculating a maximum bit rate value of data streams that can be in transit between the first and second networks taking account of bit rates observed in the first and second networks;
- processing a request for admission of a new data stream between the first and second terminals, said interface device being configured to execute said processing taking account of the result produced in said calculation step; and
- if, based on the dynamic calculation, at least one of said networks does not have resources available to execute the request, handing over said new data stream to a mobile communications network distinct from said first and second networks.

14. A method of communication between at least one first communications terminal of a first communications network, said first communications network being a wireless local area network, and at least one second communications terminal of a second communications network, said second communications network being a wide area network, said first network and said second network being interconnected via an interface device, said method comprising:
- dynamically calculating a maximum bit rate value of data streams that can be in transit between the first and second networks taking account of bit rates observed in the first and second networks; and
- processing a request for admission of a new data stream between the first and second terminals, said interface device being configured to execute said processing taking account of the result produced in said calculation step, said processing including:
  - dynamically analyzing at least one availability criterion associated with each of said networks such that:
    - if each network is available to receive said new data stream, a communication tunnel is reserved via said interface device rated as a function of the bit rate necessary to support said new data stream between said first terminal and said second terminal; and
    - if, based on the dynamic calculation, at least one of said networks does not have resources available to execute the request, said new data stream is handed over to a mobile communications network distinct from said first and second networks.

* * * * *